United States Patent
Newman

(10) Patent No.: US 9,888,672 B2
(45) Date of Patent: Feb. 13, 2018

(54) AQUARIUM FILTER ASSEMBLY, COMPONENTS THEREOF, AND METHODS

(71) Applicant: Tetra Holding (US), Inc., Blacksburg, VA (US)

(72) Inventor: Daniel A. Newman, Salem, VA (US)

(73) Assignee: Spectrum Brands, Inc., Middleton, WI (US)

( * ) Notice: Subject to any disclaimer, the term of this patent is extended or adjusted under 35 U.S.C. 154(b) by 1134 days.

(21) Appl. No.: 13/777,440

(22) Filed: Feb. 26, 2013

(65) Prior Publication Data

US 2014/0238914 A1 Aug. 28, 2014

(51) Int. Cl.
*A01K 63/04* (2006.01)

(52) U.S. Cl.
CPC ......... *A01K 63/045* (2013.01); *Y10T 29/4973* (2015.01)

(58) Field of Classification Search
CPC .............................. A01K 63/045; A01K 63/04
USPC ..................... 210/167.27, 119, 260
See application file for complete search history.

(56) References Cited

U.S. PATENT DOCUMENTS

| | | | | |
|---|---|---|---|---|
| 4,783,258 A * | 11/1988 | Willinger | ............. | A01K 63/045 210/167.22 |
| 4,880,549 A * | 11/1989 | Willinger | ............. | A01K 63/045 210/167.22 |
| 5,053,125 A | 10/1991 | Willinger et al. | | |
| 6,692,637 B2 * | 2/2004 | Fox | ...................... | A01K 63/045 210/167.22 |
| 6,797,163 B2 | 9/2004 | Carley et al. | | |
| 7,060,181 B2 | 6/2006 | Fox et al. | | |
| 7,241,379 B2 | 7/2007 | Agresta | | |
| 7,252,762 B2 | 8/2007 | Carley | | |
| 7,316,775 B2 | 1/2008 | Carley et al. | | |
| 7,416,659 B2 | 8/2008 | Newman | | |
| 7,425,274 B1 * | 9/2008 | Helfet | .................. | A01K 63/045 210/151 |
| 7,553,411 B2 * | 6/2009 | Huehn | ................. | A01K 63/045 119/259 |
| 7,638,044 B2 | 12/2009 | Huehn et al. | | |
| 7,651,609 B2 | 1/2010 | Huehn | | |
| 7,658,842 B2 | 2/2010 | Huehn et al. | | |
| 7,670,484 B2 * | 3/2010 | Newman | .............. | A01K 63/045 119/260 |
| D626,193 S | 10/2010 | Newman et al. | | |
| D628,675 S | 12/2010 | Newman et al. | | |
| 7,927,483 B2 | 4/2011 | Huehn | | |
| 8,303,811 B1 * | 11/2012 | Mihlbauer | ........... | A01K 63/045 210/167.25 |

OTHER PUBLICATIONS

Whisper® Power Filters, Instructions, Safeguards & Warranty, 12 pages (Copyright 2004).

* cited by examiner

*Primary Examiner* — Dirk R Bass
*Assistant Examiner* — Donovan Bui-Huynh
(74) *Attorney, Agent, or Firm* — Merchant & Gould P.C.

(57) ABSTRACT

An aquarium filter cartridge includes a frame and a media pack attached to the frame. The frame includes recessed sections along the sides. The filter cartridge can be part of dual filter cartridge, also including a biological host media filter element. The filter cartridge or the dual filter cartridge can be mounted in a filter housing by sliding within receiving grooves in the filter housing. Methods of servicing are included.

9 Claims, 18 Drawing Sheets

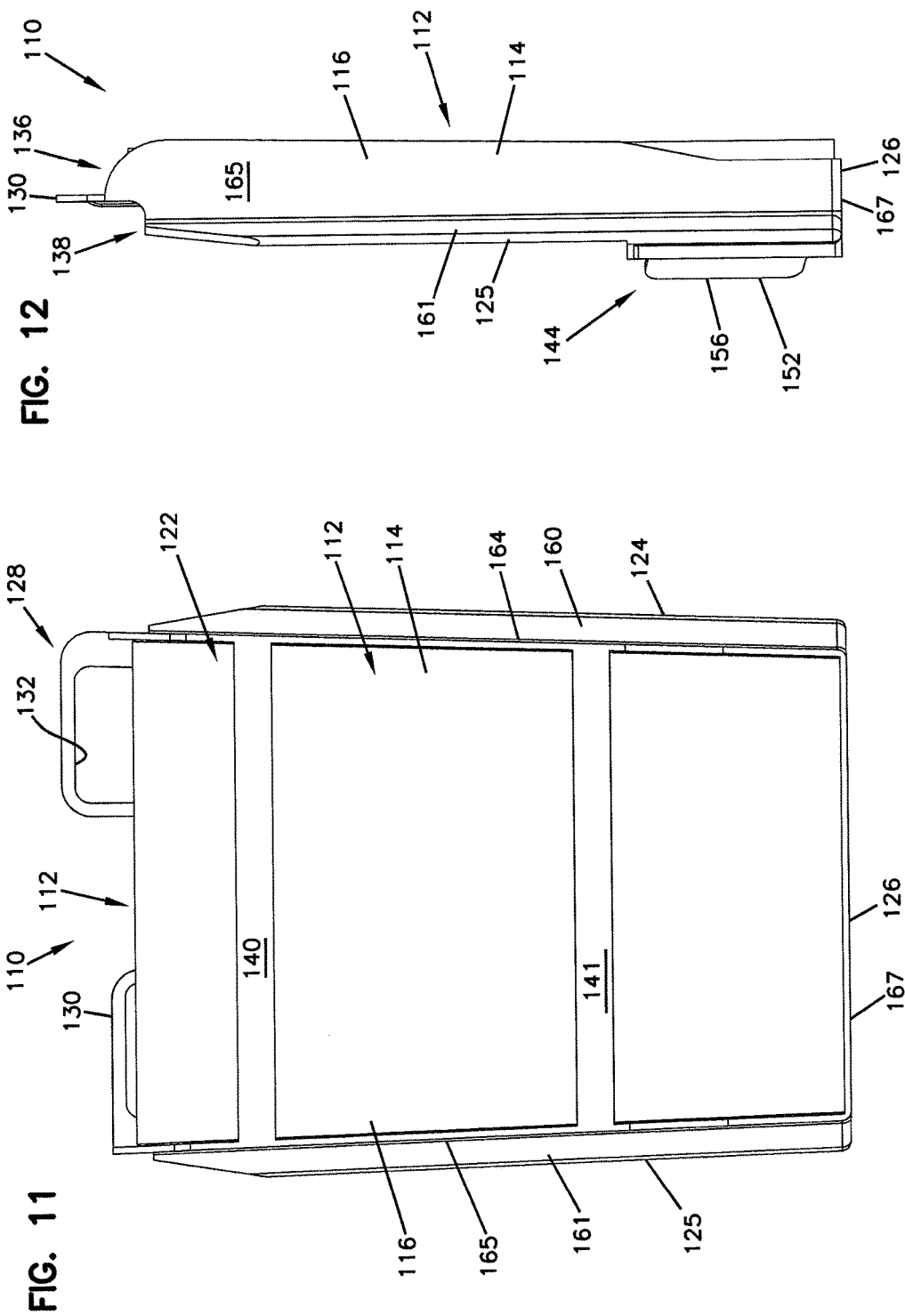

AQUARIUM FILTER ASSEMBLY, COMPONENTS THEREOF, AND METHODS

TECHNICAL FIELD

This disclosure relates to components and methods for filtering aquarium water. More particularly, this disclosure relates to an aquarium filter cartridge and a dual filter assembly for use in aquarium filter assemblies.

BACKGROUND

To maintain an ecological balance within an aquarium, it is necessary to keep the water in the aquarium clean. Cleaning is often accomplished by pumping water from the aquarium to a filter device, filtering the water through a filter medium, and returning the filtered water to the aquarium.

As aquarium water passes through the filter media, particulates trapped by the media can gradually slow or block the passage of water through the media. Thus, it is necessary for the user to periodically remove and replace the filter media.

Because the filter elements need to be changed or serviced, it can result in more waste. As more people are conscious of having "greener" products, e.g. more environmentally friendly products, there is a need for improvement in aquarium filters to have less waste.

SUMMARY

One aspect of the present disclosure relates to an aquarium filter cartridge. The filter cartridge includes a frame and a media pack attached to the frame. The frame is designed in a manner to have less material than prior art frames, which results in a more environmentally friendly product.

In one example, the frame includes a top member, bottom member, first side member, and second side member. The first side member has a first section in extension from the top member and a recessed section between the first section and the bottom member. The recessed section is laterally spaced relative to the first section toward the second side member. The second side member has a first section in extension from the top member and a recessed section between the first section of the second side member and the bottom member. The recessed section of the second side member is laterally spaced relative to the first section of the second side member toward the first side member. The media pack includes a bottom, a first side edge extending from the bottom, and a second side edge extending from the bottom. The bottom of the media pack is adjacent to the bottom member of the frame. The first side edge is adjacent to the first section of the first side member and is spaced from the recessed section of the first side member. The second side edge is adjacent to the first section of the second side member and is spaced from the recessed section of the second side member.

Another aspect of the present disclosure relates to a dual filter assembly for use in an aquarium filter. The dual filter assembly includes a cassette, a biological host media filter element, and a filter cartridge. The cassette includes a first and second edge and a bottom edge extending between the first and second edges. The cassette includes a bio-filter holder arrangement and a filter cartridge holder arrangement. The filter cartridge holder arrangement includes a first flange arrangement and a second flange arrangement. The first flange arrangement is angled inwardly from the first edge as the first flange arrangement extends from the first edge toward the bottom edge. The second flange arrangement is angled inwardly from the second edge as the second flange arrangement extends from the second edge toward the bottom edge. The biological host media filter element is removably held in the bio-filter holder arrangement. The filter cartridge is removably held in the filter cartridge holder arrangement by the first flange arrangement and second flange arrangement. The filter cartridge includes a frame and a media pack secured to the frame. The media pack is between and against the first flange arrangement and the second flange arrangement.

Yet another aspect of the present disclosure relates to an aquarium filter assembly. The filter assembly includes a housing and a filter cartridge as characterized above. The housing has a side wall, an interior volume, a water inlet, and a water outlet. The side wall has first and second opposing receiving grooves in the interior volume. The first receiving groove has a sloped section that is angled inwardly toward the second groove. The second receiving groove has a sloped section that is angled inwardly toward the first groove. The filter cartridge is removably oriented in the first and second receiving grooves. The water inlet is upstream of the filter cartridge, and the water outlet is downstream of the filter cartridge. The recessed section of the first side member is adjacent to the first receiving groove sloped section. The recessed section of the second side member is adjacent to the second receiving groove sloped section.

Yet another aspect of the present disclosure relates to an aquarium filter assembly including a housing and the dual filter assembly as characterized above. The housing includes a side wall, an interior volume, a water inlet, and a water outlet. The dual filter assembly is removably oriented in the interior volume of the housing, with the water inlet being upstream of the dual filter assembly, and the water outlet being downstream of the dual filter assembly.

Yet another aspect of the present disclosure relates to a method of servicing an aquarium filter assembly. The method includes removing a filter cartridge, as characterized above, from an interior volume of a filter housing. The media pack is removed from the frame of the filter cartridge. A new media pack is provided and secured to the frame so that a bottom of the new media pack is adjacent to the bottom member of the frame, a first side edge of the new media pack is adjacent to the first section of the first side member and is spaced from the recessed section of the first side member, and a second side edge of the new media pack is adjacent to the first section of the second side member and is spaced from the recessed section of the second side member.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

BRIEF DESCRIPTION OF THE DRAWINGS

FIG. 11 is a rear view of the assembled bio-cartridge of FIGS. 9 and 10;

FIG. 12 is a side view of the assembly of FIG. 11;

DETAILED DESCRIPTION

Reference will now be made in detail the various features of the present disclosure that are illustrated in the accompanying drawings. Wherever possible, the same reference numbers will be used throughout the drawings to refer to the same or similar parts.

A. Overview of Assembly

Figure 1:
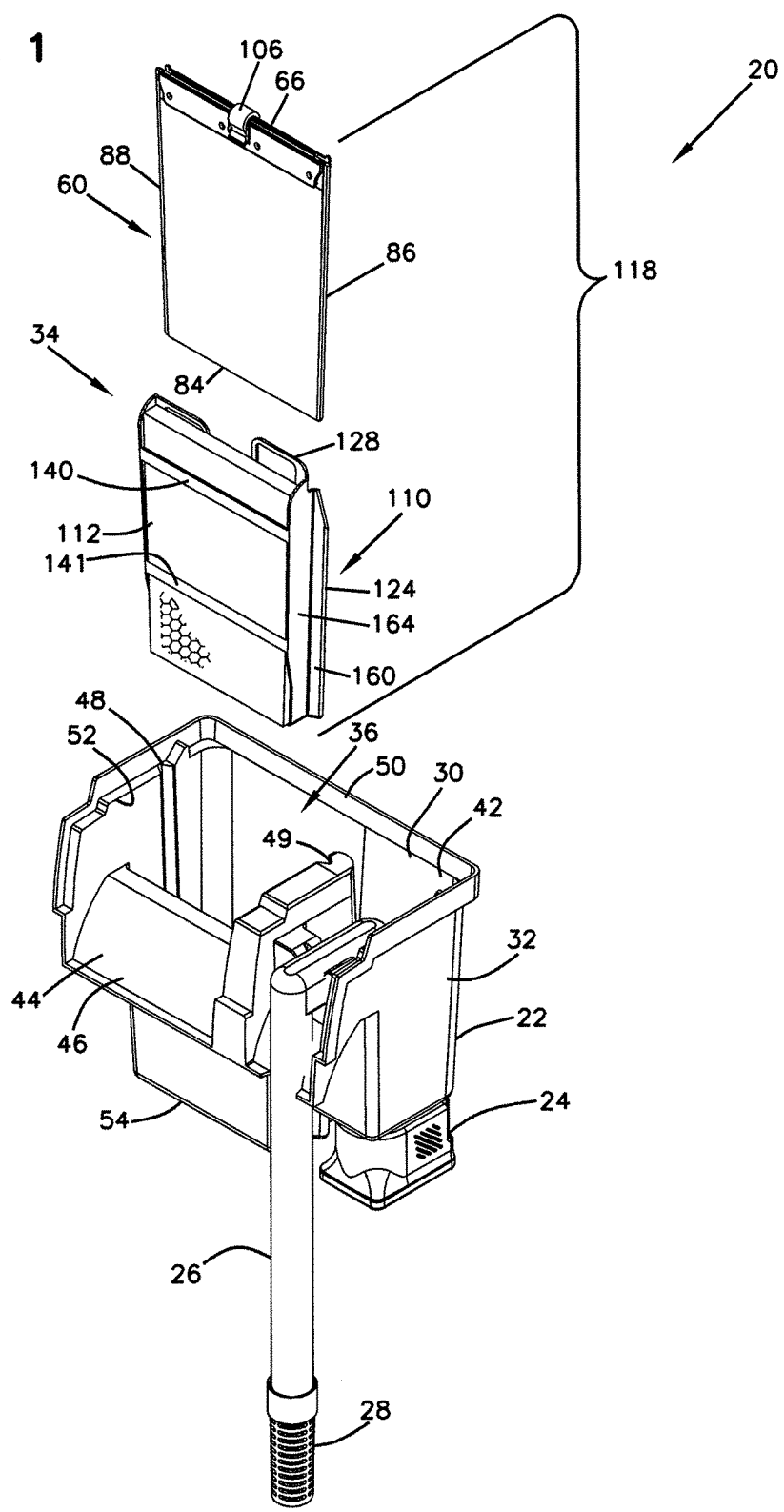
FIG. 1 is a front, exploded perspective view of an aquarium filter assembly made in accordance with principles of this disclosure.

FIG. 1 illustrates an aquarium filter assembly generally at 20. The filter assembly 20 generally includes a filter housing 22. The housing 22 typically mounts externally to or at the outside of an aquarium (not shown). A pump assembly 24 draws water from the aquarium through an intake tube 26. The intake tube 26 extends into the aquarium and draws water by way of the pump assembly 24 through an intake arrangement 28. The water is directed by the intake tube into an interior volume 30 of the housing 22. The interior volume 30 is defined by a surrounding sidewall 32 of the housing 22.

Figure 3:
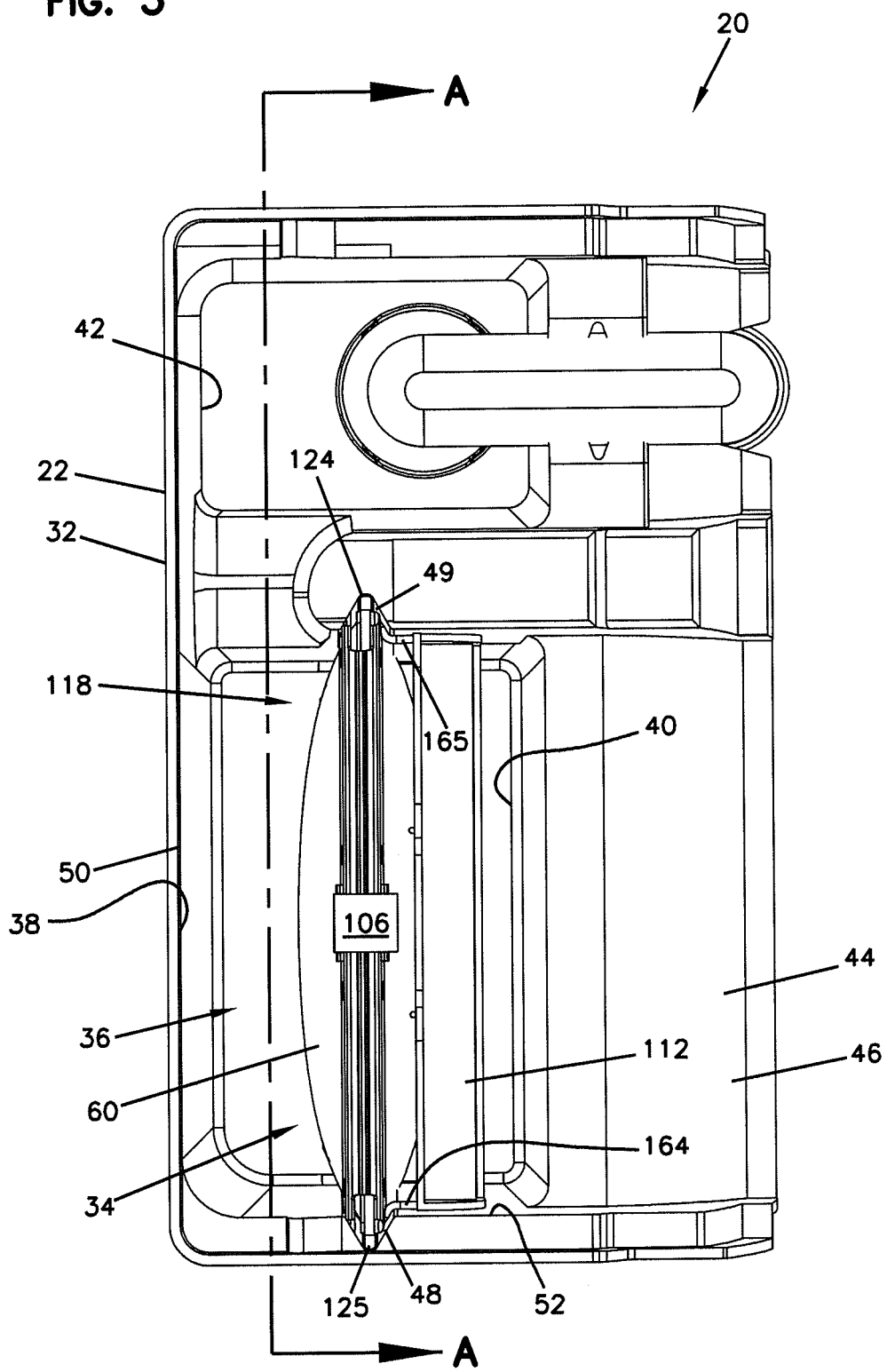
FIG. 3 is a top view of an assembled filter assembly of FIGS. 1 and 2.
Figure 4:
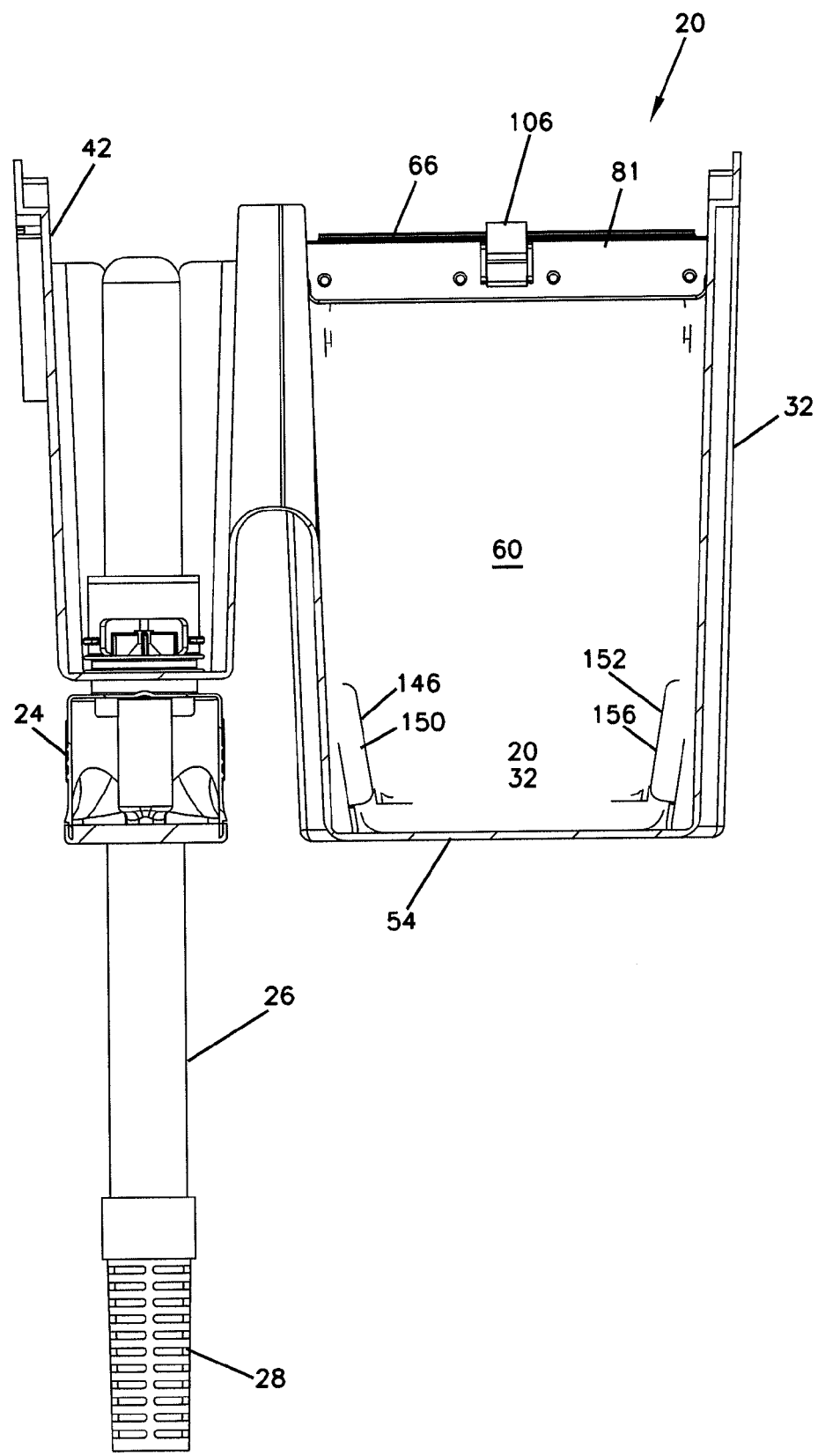
FIG. 4 is a cross-sectional view of the filter assembly of FIG. 3, the cross-section being taken along the line A-A of FIG. 3.

Still in reference to FIG. 1, the aquarium filter assembly 20 includes filter components 34. The filter components 34 are shown in exploded view removed from the housing 22. FIGS. 3 and 4 show the filter components 34 operably installed within the housing 22.

The filter components, when installed in the housing 22 divides a filter chamber 36, which is part of the interior volume 30, into an intake chamber 38 (FIG. 3) and a discharge chamber 40 (FIG. 3). Water flow from the intake tube 26 is directed into a water inlet 42 of the housing 22 and into the intake chamber 38. The water then passes through the filter components 34 and into the discharge chamber 40. Once the water level in the discharge chamber 40 reaches a sufficient height, the filtered water exits the housing 22 by way of a water outlet 44. In this example, the water outlet 44 operates as a spillway 46. The spillway 46 is constructed to mount over an edge of the aquarium so that the filtered water is directed back into the aquarium.

Figure 2:
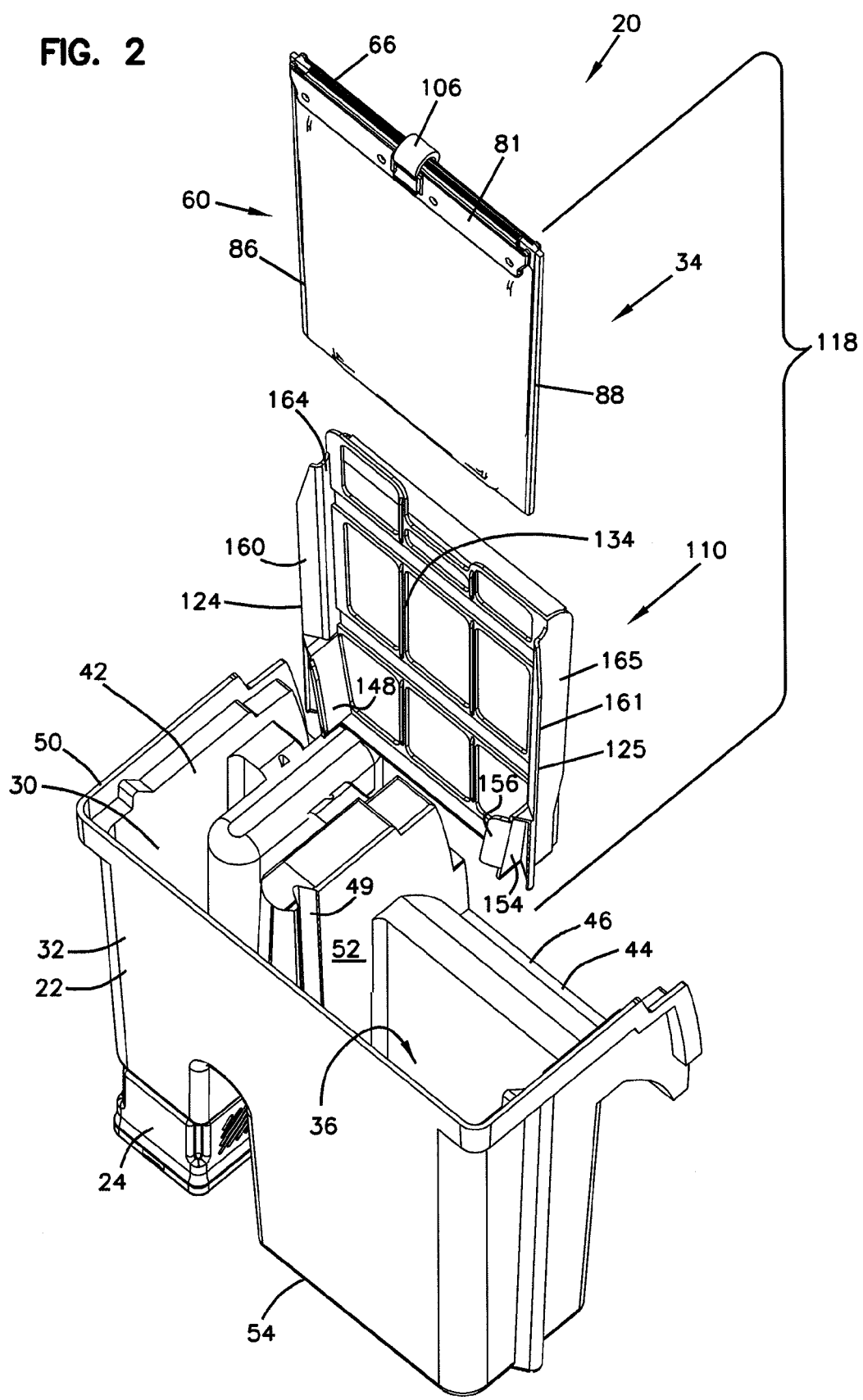
FIG. 2 is a rear, exploded perspective view of the filter assembly of FIG. 1.

In this embodiment, the sidewall 32 of the housing 22 includes first and second opposing receiving grooves 48, 49. The receiving grooves 48, 49 extend from the open top 50 of the housing 22 vertically along the inside surface 52 of the sidewall 32 to the closed bottom 54 of the housing 22. In FIGS. 1-3, it can be seen how, in this non-limiting example, the first and second receiving grooves 48, 49 have a generally V-shaped cross section. Other embodiments are possible.

In general, the first and second receiving grooves 48, 49 are provided to receive the filter components 34. The receiving grooves 48, 49 help to properly orient and mount the filter components 34 so that water to be filtered that is in the intake chamber 38 must pass through the filter components 34 in order to reach the discharge chamber 40.

B. Filter Component Examples

1. Example Filter Cartridge, FIGS. 5-8

Figure 18:
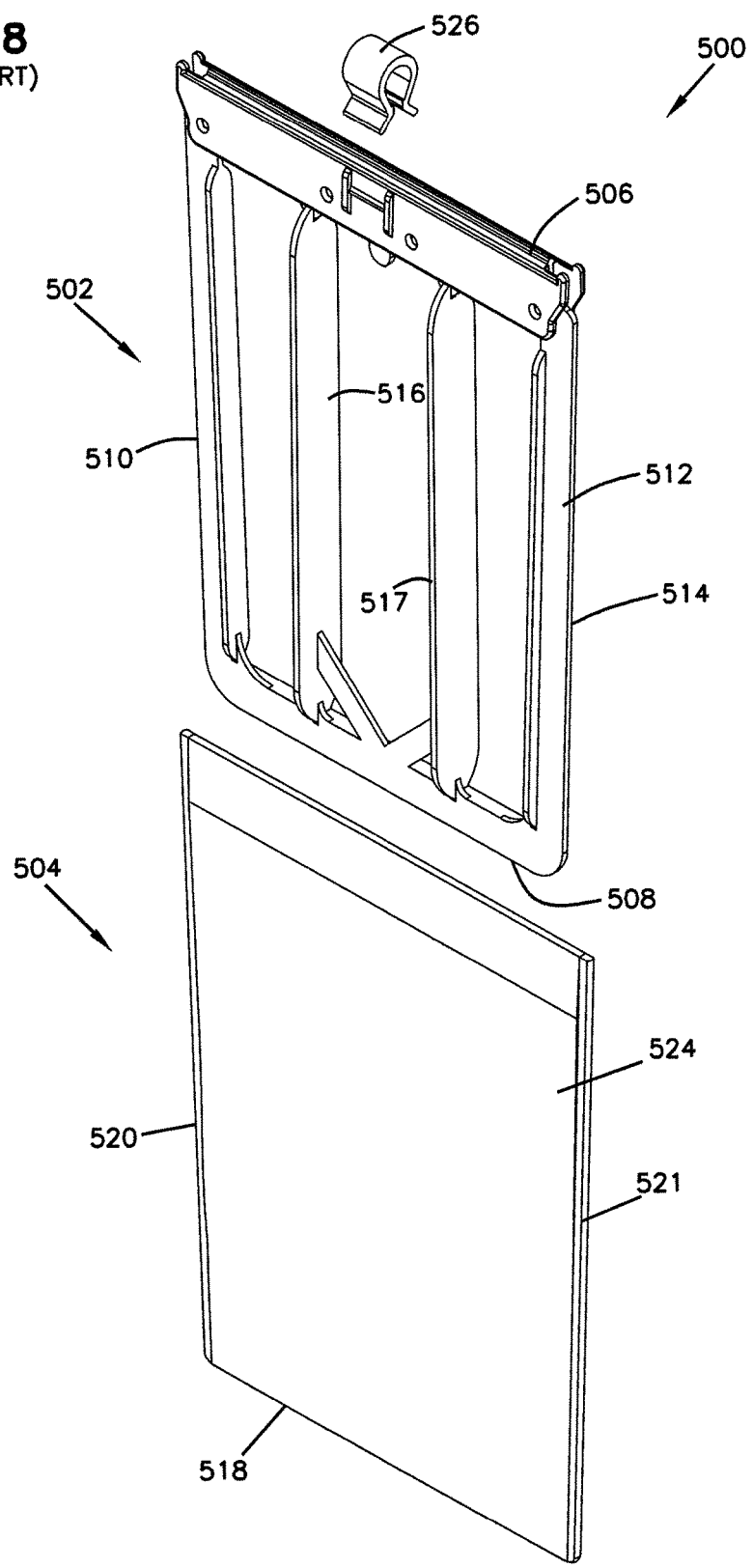
FIG. 18 is an exploded perspective view of a prior art filter cartridge.
Figure 19:
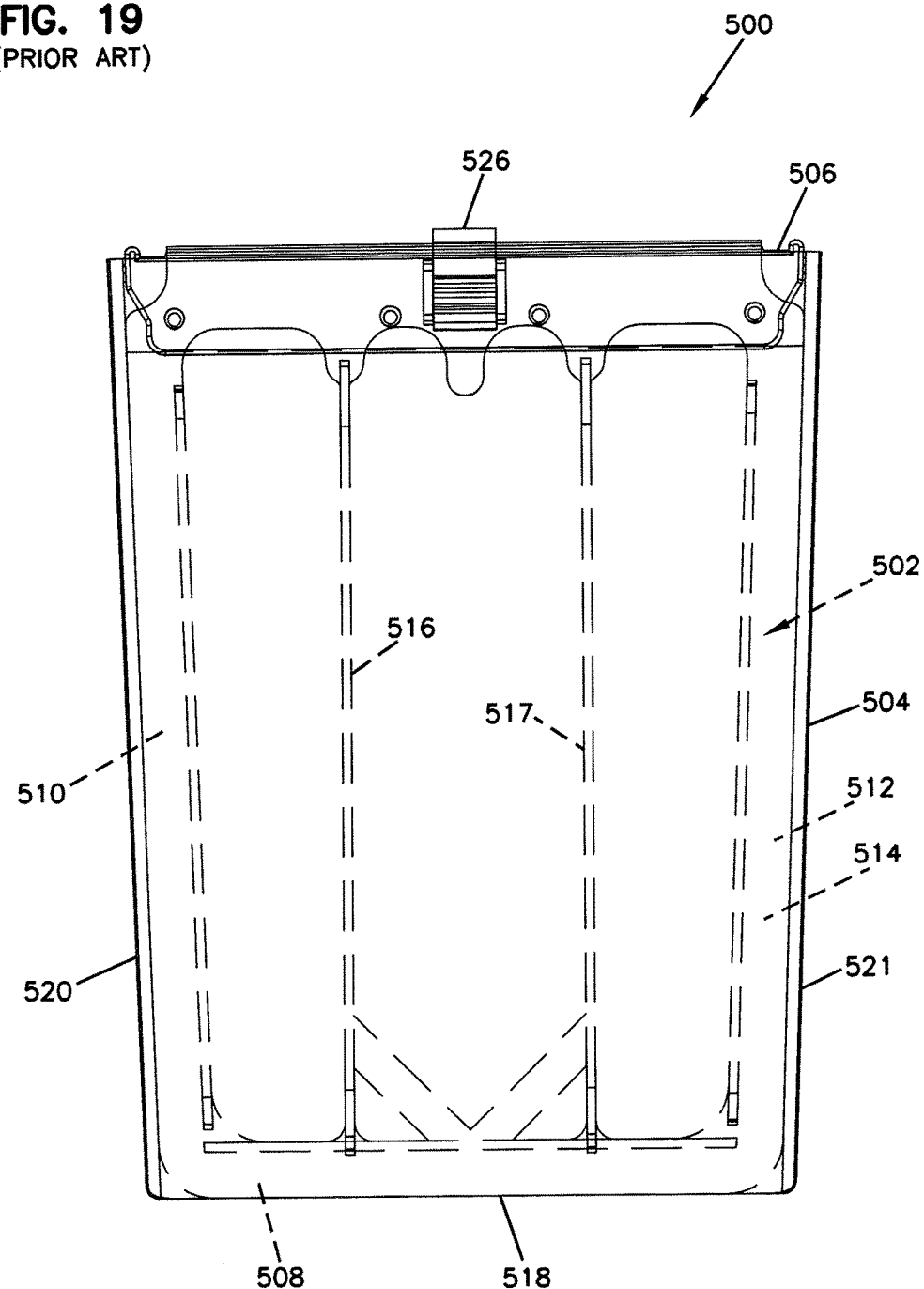
FIG. 19 is a front view of the prior art filter cartridge of FIG. 18, and depicting the frame and phantom lines.

Improvement Over the Prior Art, FIGS. 18-19.

As mentioned above, there is a need for improvement in creating more environmentally friendly systems for aquarium filters. FIGS. 18 and 19 illustrate a filter cartridge 500 made according to the prior art. The prior art filter cartridge 500 includes a frame 502 and a media pack 504. The media pack 504 can be removably attached to the frame 502.

The frame 502 includes a top member 506, a bottom member 508, a first side member 510 between the top member 506 and bottom member 508, and a second side member 512 between the top member 506 and bottom member 508.

The first and second side members 510, 512 include straight extensions, which are approximately perpendicular to the top member 506 and bottom member 508. There can be about a 1 degree draft angle, so the side member 510, 512 will not be exactly perpendicular to the top member 506 and bottom member 508. The result of the arrangement of the top member 506, bottom member 508, first side member 510, and second side member 512 is an approximate rectangular frame piece 514.

The frame 502 further includes additional support members 516, 517 generally parallel to the first and second side members 510, 512 and extending in between the top member 506 and bottom member 508. As can be seen in FIGS. 18 and 19, the support members 516, 517 are between the first and second side members 510, 512.

The media pack 504 is attached to the frame 502. The media pack 504 includes a bottom 518, a first side edge 520 extending from the bottom 518, and a second side edge 521 extending from the bottom 518.

When the media pack 504 is attached to the frame 502, the bottom 518 is adjacent to the bottom member 508; the first side edge 520 is adjacent to the first side member 510; and the second side edge 521 is adjacent to the second side member 512.

In the prior art embodiment of FIGS. 18 and 19, the media pack 504 is embodied as a sock 524, which fits over and around the frame 502. A clip 526 secures the sock 524 to the frame 502.

The improved filter cartridge of FIGS. 5-8 and 20 provides for a greener and more environmentally friendly filter cartridge than the prior art cartridge 500 of FIGS. 18 and 19. This result is obtained at least by including less material in the frame.

In reference now to FIGS. 5-8 and 20, a filter cartridge made in accordance with principles of this disclosure is shown at 60. The filter cartridge 60 is one of the filter components 34 (FIG. 1) that is used to clean the aquarium water in the aquarium filter assembly 20.

The filter cartridge 60 includes a frame 62 and a media pack 64. The media pack 64 is removably attachable to the frame 62. When the filter cartridge 60 is operably installed in the housing 22, water to be filtered flows through the media pack 64, and the media pack 64 cleans the aquarium water.

Figure 5:
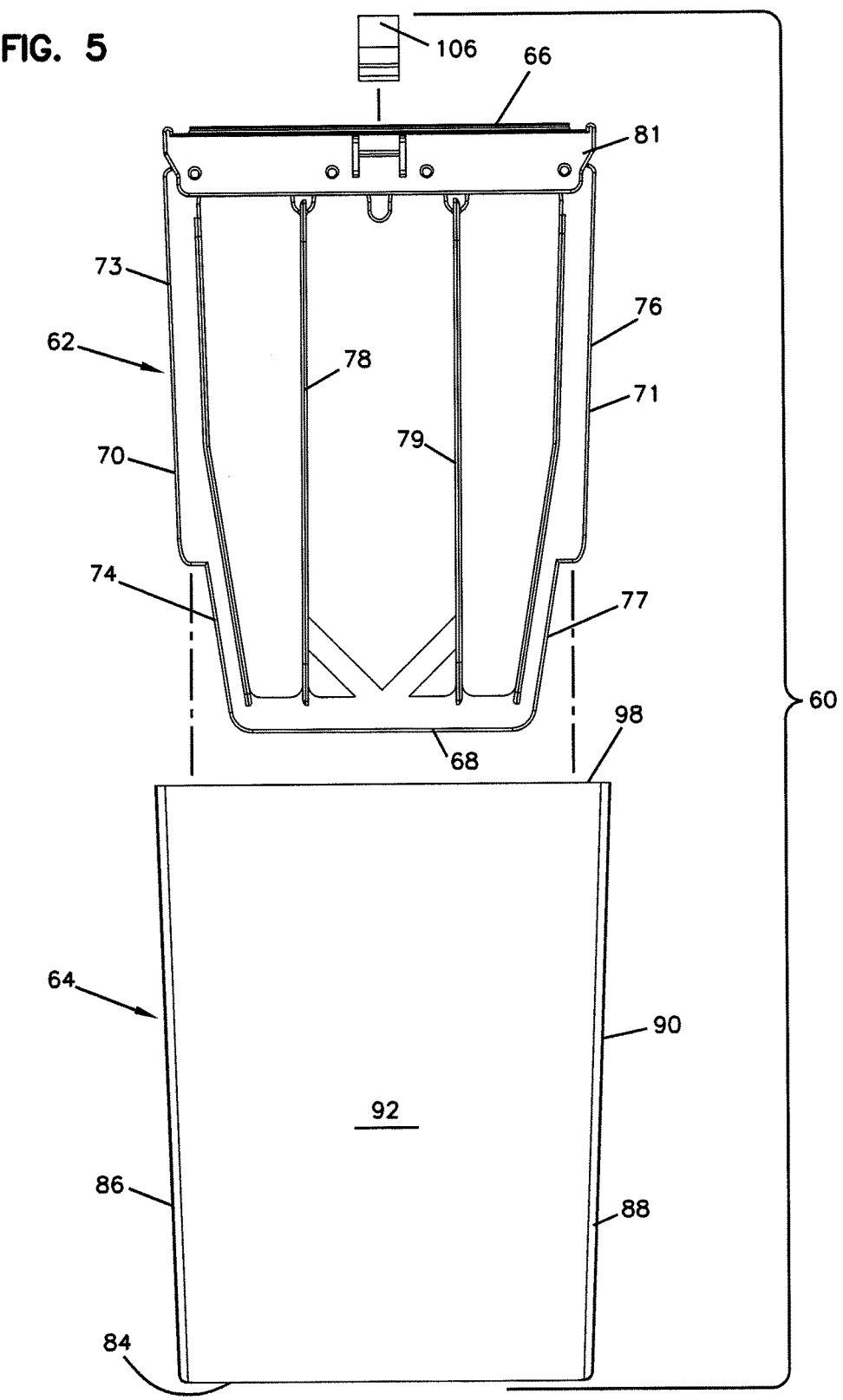
FIG. 5 is an exploded front view of a filter cartridge used in the filter assembly of FIGS. 1-4.
Figure 7:
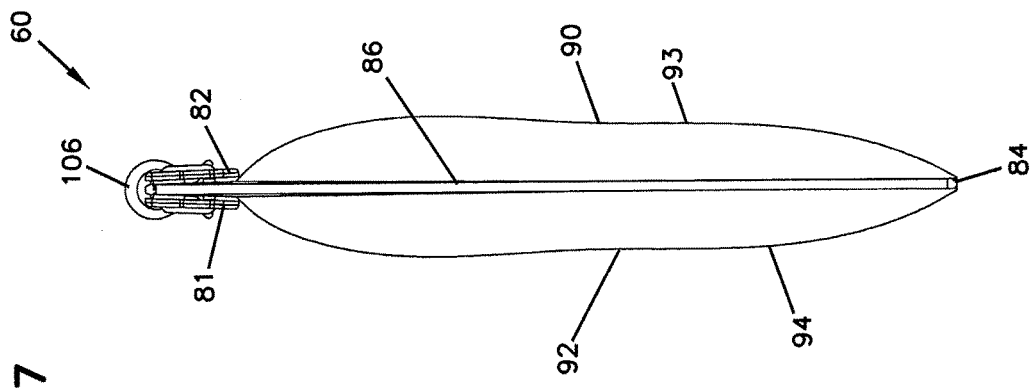
FIG. 7 is a side view of the filter cartridge of FIG. 6.
Figure 6:
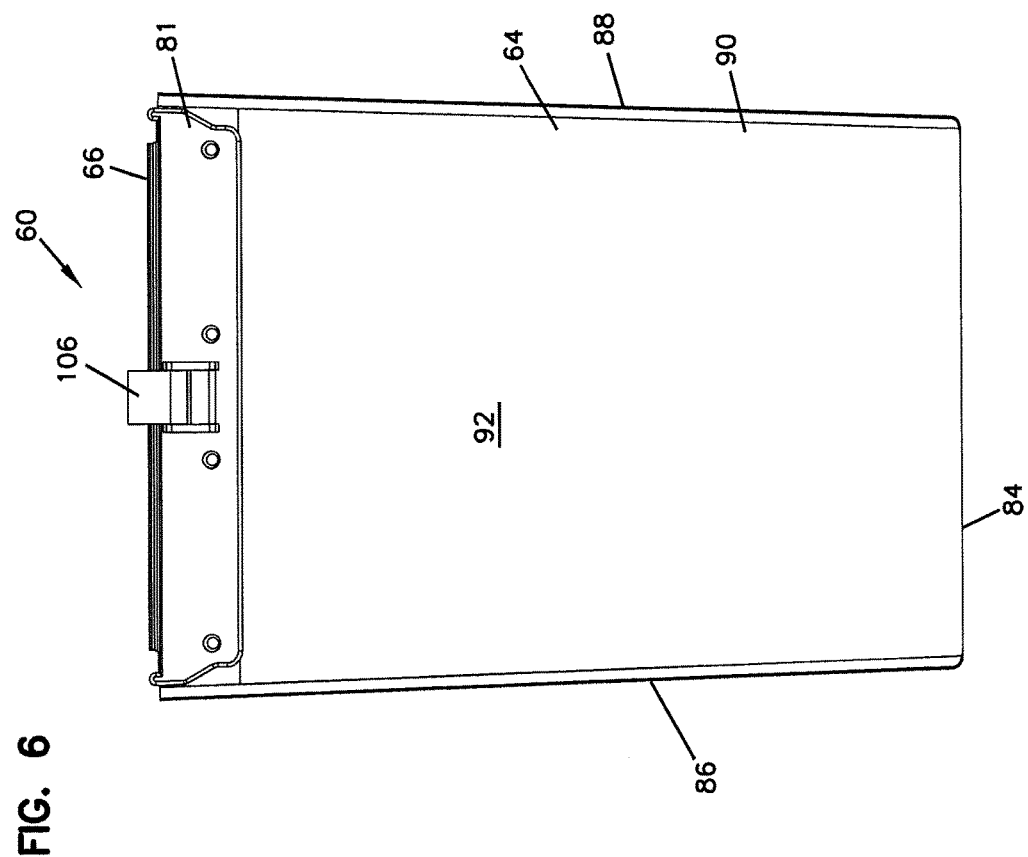
FIG. 6 is a front view of the assembled filter cartridge of FIG. 5.

In FIG. 5, the frame 62 is illustrated as having a top member 66 at one end of the frame 62 and a bottom member 68 at an opposite end of the frame 62. Between the top member 66 and bottom member 68 are first and second side members 70, 71.

In the illustrated embodiment, the first side member 70 has a first section 73 in extension from the top member 66. The first side member 70 further includes a recessed section 74 located between the first section 73 and the bottom member 68. As can be appreciated by reviewing FIG. 5, the recessed section 74 is laterally spaced relative to the first section 70 in a direction toward the second side member 71.

The recessed section 74 of the first side member 70 may extend a distance of less than 50% of a total distance between the top member 66 and the bottom member 68. In many arrangements, the recessed section 74 of the first side member 70 extends a distance of greater than 20% of a total distance between the top member 66 and bottom member 68. In some arrangements, the recessed section 74 extends a distance 20-50% of a total distance between the top member 66 and the bottom member 68.

Still within reference to FIG. 5, the recessed section 74 of the first side member 70 is angled inwardly from the first section 73 of the first side member 70 to the bottom member 68. This angle can be between 5-20°, and will be typically 7-15°.

The second side member 71 has a first section 76 in extension from the top member 66. In the preferred arrangement illustrated, the first section 73 of the first side member 70 is parallel to the first section 76 of the second side member 71.

The second side member 71 further includes a recessed section 77. In the example shown, the recessed section 77 is between the first section 76 and the bottom member 68. The recessed section 77 of the second side member 71 is laterally spaced relatively to the first section 76 of the second side member 71 in a direction toward the first side member 70. In preferred arrangements, the recessed section 77 of the second side member 71 may extend a distance of less than 50% of a total distance between the top member 66 and the bottom member 68. In many preferred arrangements, the recessed section 77 of the second side member 71 extends a distance greater than 20% of a total distance between the top member 66 and the bottom member 68. Many typical arrangements provide that the recessed section 77 of the second side member 71 extends a distance of 20-50% of a total distance between the top member 66 and bottom member 68.

The recessed section 77 of the second side member 71 is preferably angled from the first section 76 to the bottom member 68. For example, the recessed section 77 can be angled inwardly between 5-20° from the first section 76 to the bottom member 68. Typically, this angle can be between 7-15°.

It should be appreciated that by comparing the frame 62 to the frame 502, the construction of the frame 62, including the recessed sections 74, 77 results in the frame 62 as using less material, which contributes to a greener and more environmentally friendly product.

In many preferred arrangements, the frame 62 further includes at least a pair of supporting bars 78, 79 between the first side member 70 and second side member 71 and in extension between the top member 66 and bottom member 68. The bars 78, 79 enhance the structural integrity of the frame 62 and may be arranged in many different geometries. In the particular embodiment shown, the bars 78, 79 are generally parallel to the first section 73 of the first side member 70 and the first section 76 of the second side member 71.

Figure 8:
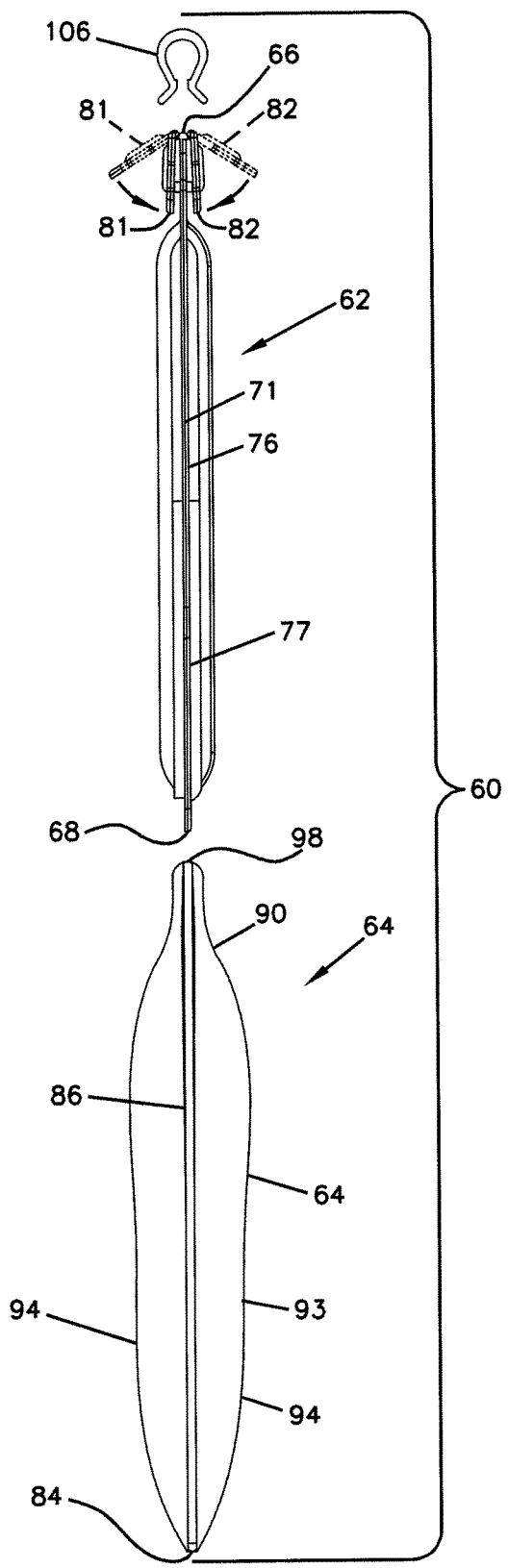
FIG. 8 is an exploded, side view of the filter cartridge of FIGS. 5-7.

In reference now to FIGS. 5 and 8, in the example illustrated, the frame 62 further includes first and second flanges 81, 82 extending from opposite sides of the top member 66. In the example shown, the first and second flange 81, 82 flexibly extend from opposite sides of the top member 66. FIG. 8 illustrates the flanges 81, 82 in phantom lines as being flexed radially outwardly in a direction away from the top member 66. The arrows in FIG. 8 show the flanges 81, 82 being flexed inwardly toward each other and toward the top member 66. The purpose of the flanges 81, 82 is to secure the media pack 64, in one example embodiment, as to be described further below.

The media pack 64, as mentioned above, is removably attachable to the frame 62. In the embodiment shown, the media pack 64 includes a bottom 84, a first side edge 86 extending from the bottom 84, and a second side edge 88 extending from the bottom 84.

Figure 20:
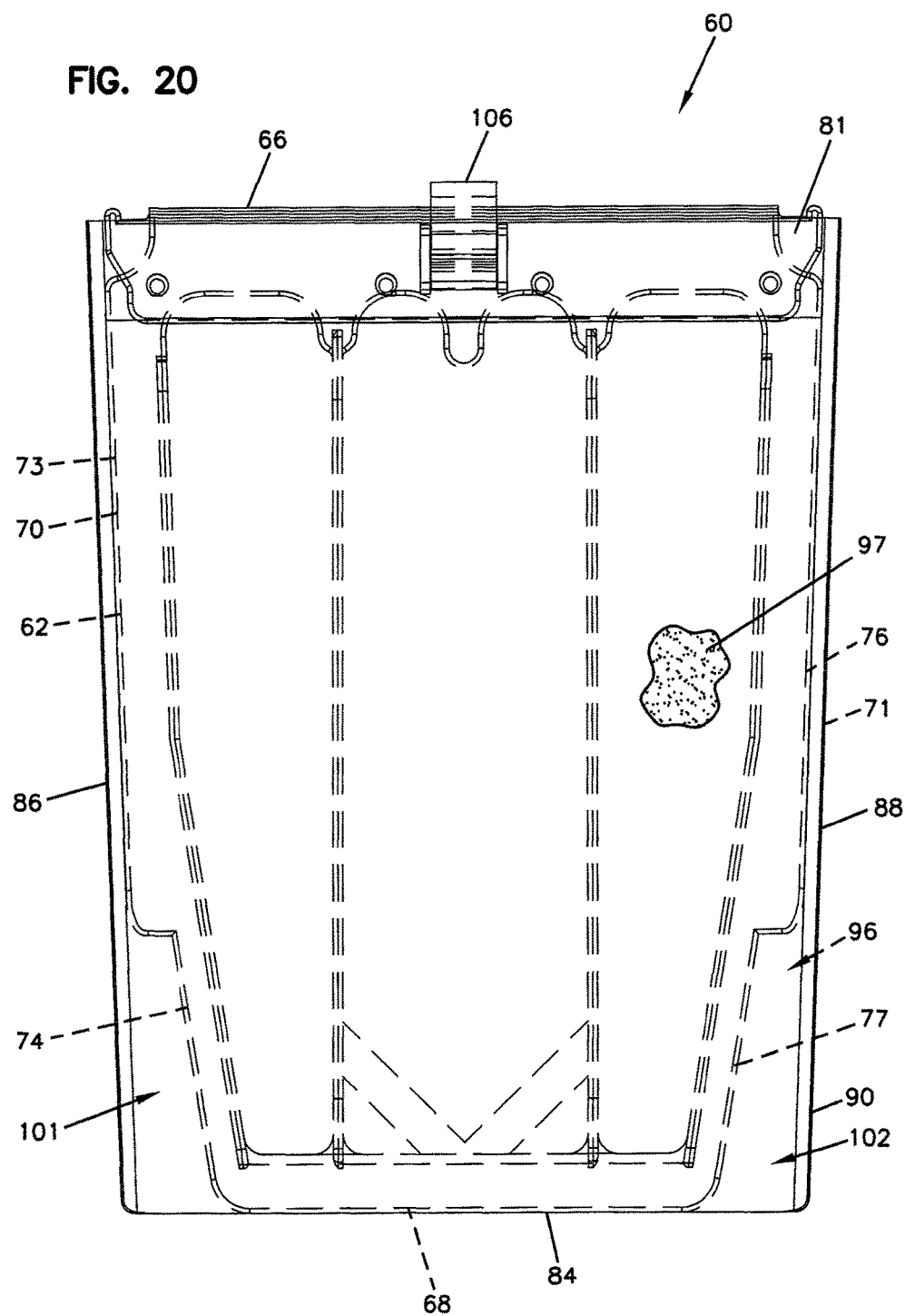
FIG. 20 is a front view of the assembled filter cartridge of FIGS. 5-8, the filter frame being shown in phantom lines.

When the media pack 64 is attached to the frame 62, the bottom 84 of the media pack 64 is adjacent to the bottom member 68 of the frame 62; the first side edge 86 is adjacent to the first section 73 of the first side member 70; the first side edge 86 is spaced from the recessed section 74 of the first side member 70; the second side edge 88 is adjacent to the first section 76 of the second side member 71; and the second side edge 88 is spaced from the recessed section 77 of the second side member 71. FIG. 20 illustrates the media pack 64 being releasably attached to the frame 62. The frame 62 can be seen in phantom lines.

Many different embodiments of media packs 64 are usable. In the illustrated embodiment, the media pack 64 is embodied as a filter envelope or sock 90. The sock 90 can be formed of any suitable porous filtration material. For example, the media pack 64 can be constructed of synthetic resin fibers in a random or non-woven pattern.

In the particular embodiment that is illustrated, the sock 90 includes opposing panel sections 92, 93 (FIGS. 7 and 8) forming a surrounding wall 94 with the first side edge 86 and second side edge 88 and the bottom 84 being a closed bottom. The surrounding wall 94 and the bottom 84 define an interior volume 96 (FIG. 20). The sock 90 includes an open mouth 98 opposite of the closed bottom 84.

The frame 62 is removably oriented in the interior volume 96 of the sock 90 to provide the open mouth 98 to be adjacent to the top member 66 of the frame 62. In FIG. 20, the frame 62 can be seen removably oriented in the interior volume 96 of the sock 90. FIG. 20 also illustrates the first side edge 86 of the sock 90 as being spaced from the recessed section 74, and the second side edge 88 being spaced from the recessed section 77. The filter media of the media pack 64 forms first and second sections 101, 102 of media that are frame-free between the panel sections 92, 93. In the example shown in FIG. 20, the first and second sections 101, 102 are generally wedge or trapezoidal shaped.

To assemble the sock 90 to the frame 62, in this embodiment, a rim 104 of the sock 92 is received between the first and second flanges 81, 82. Preferably, the rim 104 of panel section 92 will be between and against the first flange 81 and the top member 66, while the rim 104 on panel section 93 will be between and against the top member 66 and section flange 82. A removable pressure clip 106 can be oriented over the first and second flanges 81, 82 to press or squeeze the flanges 81, 82 in a direction toward each other, which will forcibly hold the sock 90 to the frame 62. Many other embodiments are possible, and the one illustrated is only one of many possibilities.

Within the interior volume 96 of the sock 90 can be additional filter media, such as activated carbon 97 (shown in phantom in FIG. 20, in only a portion of the interior volume 96 of the sock 90). Activated carbon 97 can be put in interior volume 96 and held within the interior volume 96 along with the frame 62. The activated carbon 97 can help remove odors and tannins from the aquarium water. Alternative media are possible.

2. Example Bio-Cartridge, FIGS. 9-12

Another part of the filter components 34 shown in FIG. 1 includes a bio-cartridge 110. The bio-cartridge 110 can include a biological host media filter element 112 which is capable of supporting beneficial bacteria in an aquarium filter removably oriented within a cassette 120. The biological host media filter element 112 can be embodied in various forms including sintered ceramic, air-laid heavy denier fiber, extruded plastic mat, or a plastic molded bed of nails or similar scheme to maximize surface area. In the embodiment illustrated, the biological host filter media element 112 includes a foam element 114.

Figure 10:
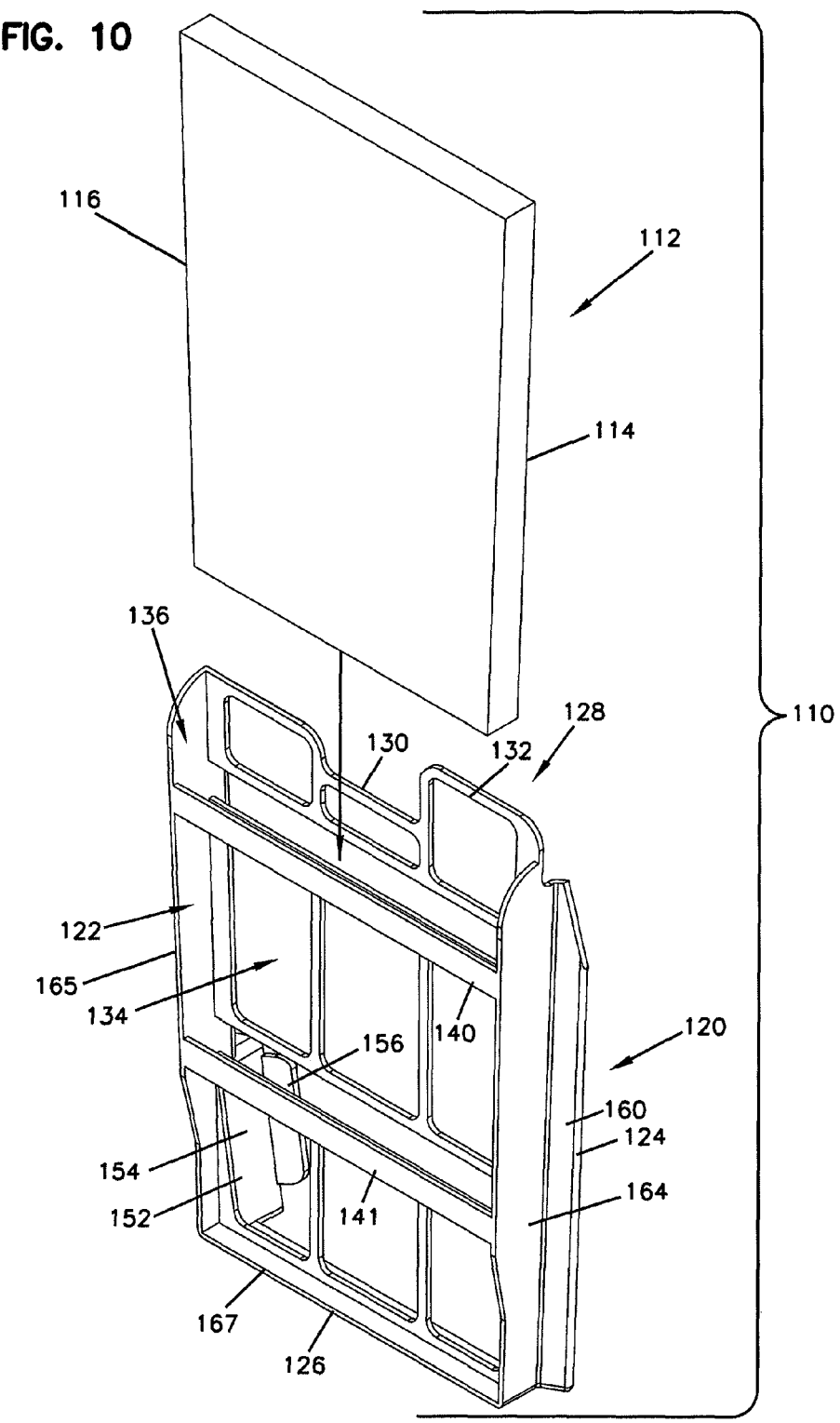
FIG. 10 is a perspective, exploded view of the assembly of FIG. 9.

The embodiments shown in FIGS. 10 and 11 illustrate the foam element 114 in the form of a rectangular construction 116. In other embodiments, the foam element 114 could be other shapes.

The cassette 120 includes a bio-filter holder arrangement 122 (FIGS. 10 and 11) for removably holding the biological host filter media element 112. While many embodiments are possible, in the embodiment shown, the bio-filter holder arrangement 122 includes first and second bars 140, 141 that retain or hold the element 112 in place in the cassette 120.

The cassette 120 can have many embodiments. In the one shown, the cassette 120 includes first and second side pieces 164, 165, and a bottom piece 167 therebetween.

In preferred arrangements, the cassette 120 includes first and second edges 124, 125 and a bottom edge 126, which is defined along the bottom member 167. The first and second edges 124, 125 of the cassette 120 can form end portions of first and second slide rails 160, 161 (FIGS. 10 and 11). The slide rails 160, 161 are angled relative to and can be generally (about) perpendicular to the first and second side pieces 164, 165.

In preferred embodiments, a handle 128 extends from the cassette 120 at an end 130 of the cassette 120 that is opposite of the bottom edge 126. In this example embodiment, the handle 128 is in the form of an open aperture 132 that is sized to accommodate at least a few fingers of a human hand.

Figure 14:
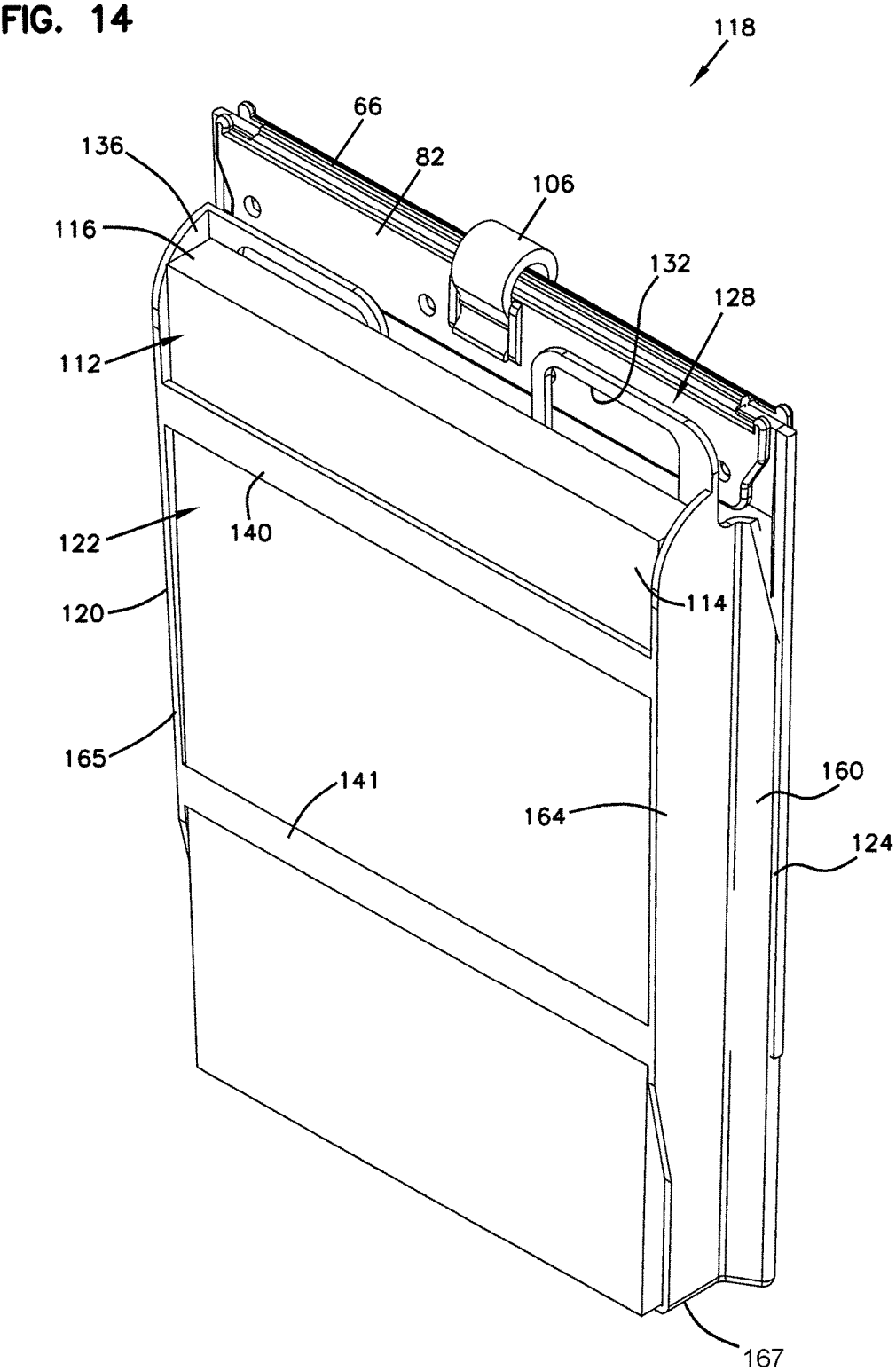
FIG. 14 is a rear, perspective view of the assembled dual filter assembly of FIG. 13.
Figure 15:
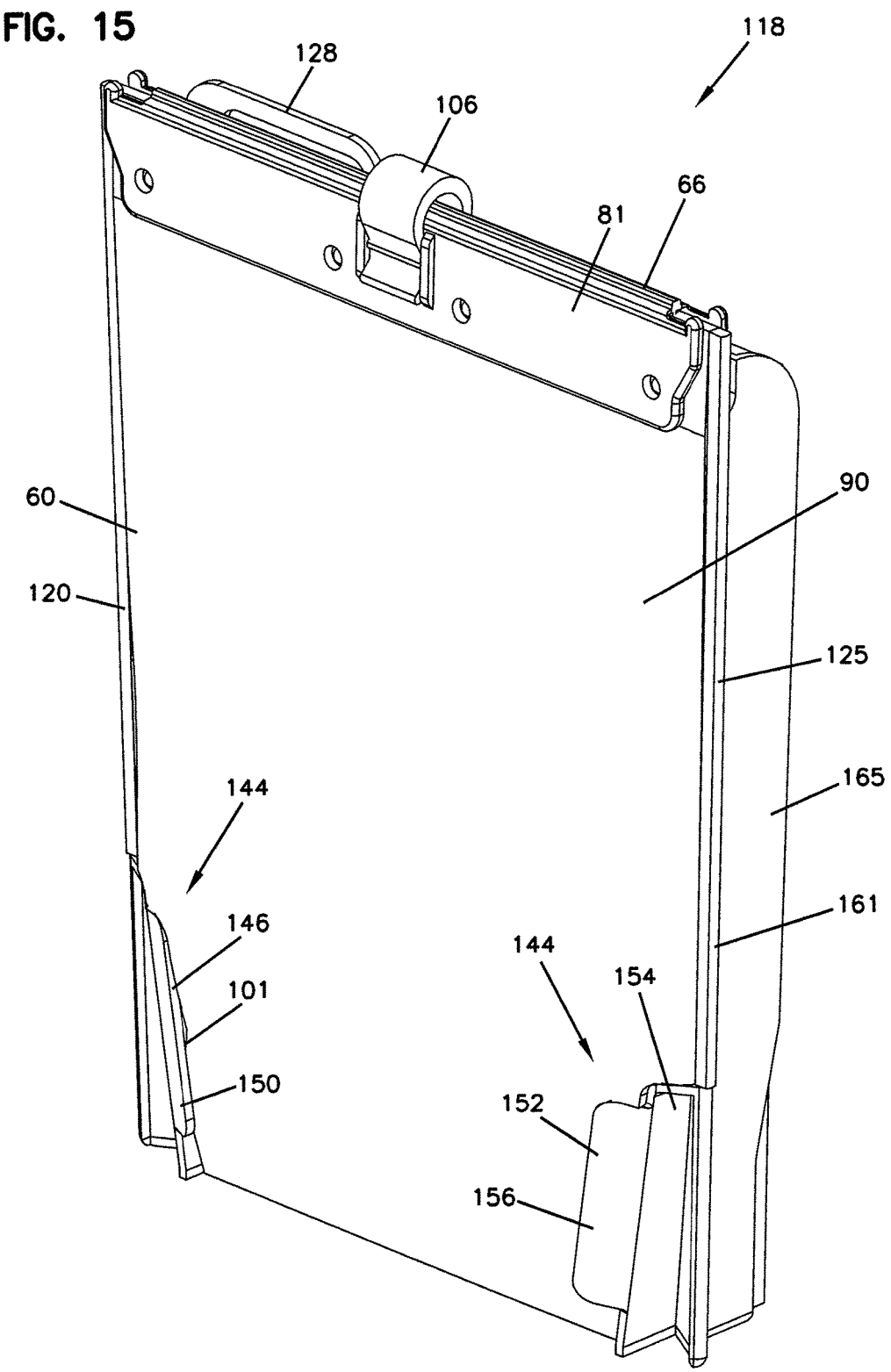
FIG. 15 is a front perspective view of the dual filter assembly of FIG. 14.

The bio-cartridge 110 can be part of a dual filter assembly 118, the complete assembled dual filter assembly 118 being shown in FIGS. 14 and 15. Many different embodiments can be made. In this example, the cassette 120 includes a grid 134 between the first side piece 164 and second side piece 165. The grid 134 divides the cassette 120 to a bio-side 136 and a filter cartridge side 138 (FIG. 12). The bio-side 136 includes the bio-filter holder arrangement 122.

In this embodiment, the first and second bars 140, 141 are illustrated as joining and extending between the first and second side pieces 164, 165. In this way, the biological host filter media element 112, for example the foam element 114, is held or contained between and against the bars 140, 141 and the grid 134. Of course, many other embodiments can be made.

Figure 9:
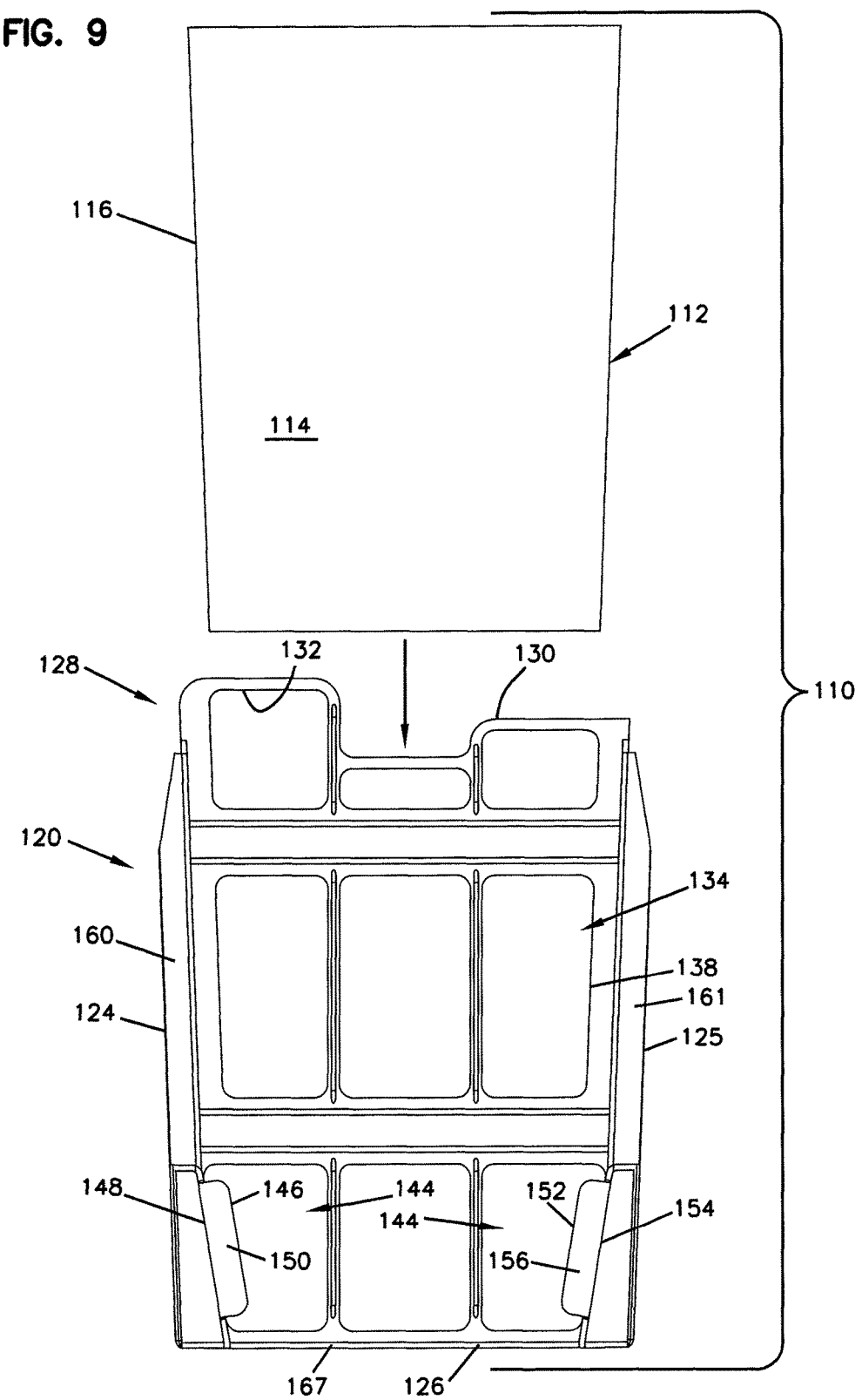
FIG. 9 is a front exploded view of a bio-cartridge assembly, including a cassette and a biological host media element.

In FIGS. 9-11, it can be seen how the foam element 114 can be removably mounted within the cassette 120 by placing it in the bio-side 136 to be held by the bio-filter holder arrangement 122. In the non-limiting example shown, the holder arrangement 122 includes the bars 140, 141, which will trap the foam element 114 against the grid 134. In FIG. 11, the biological host filter media element 112, as embodied by the foam element 114 for example, is shown occupying the entire volume of the bio-side 136 between the first and second edges 124, 125 and extending completely from the bottom edge 126 to or past the end 130 of the cassette 120.

3. Example Dual Filter Assembly, FIGS. 13-15

As mentioned above, the dual filter assembly 118 can be part of the filter components 34. The dual filter assembly 118, in this non-limiting example, includes both the bio-filter holder arrangement 122 and a filter cartridge holder arrangement 144 on the filter cartridge side 138.

A variety of embodiments are possible for the filter cartridge holder arrangement 144. In the embodiment illustrated, the filter cartridge holder arrangement 144 includes a first flange arrangement 146. In the example shown, the first flange arrangement 146 is angled inwardly from the first edge 124 as the first flange arrangement 146 extends from the first edge 124 towards the bottom edge 126.

In many preferred arrangements, the first flange arrangement 146 extends a distance along the first edge 124 from the bottom edge 126 of less than 50% of a total distance of the first edge 124.

In preferred arrangements, the first flange arrangement 146 is angled inwardly between 5-20° from the first edge 124 to the bottom edge 126.

In an example implementation, the first flange arrangement 146 includes a ramp 148. The ramp 148 is angled inwardly between 5-20° from the first edge 124 in a direction toward the bottom edge 126.

In a preferred, non-limiting example, the first flange arrangement 144 includes a lip 150. The lip 150 can be spaced from and facing the grid 134. The lip is helpful in holding the filter cartridge 60 in the filter cartridge holder arrangement 144 and against the grid 134. In one example, the lip 150 is angled from an edge of the ramp 148 and can be from about 90°-130° relative to the ramp 148.

The filter cartridge holder arrangement 144 further includes a second flange arrangement 152. In the embodiment shown, the second flange arrangement 152 is angled inwardly from the second edge 125 as the second flange arrangement 152 extends from the second edge 125 toward the bottom edge 126.

In many typical arrangements, the second flange arrangement 152 extends a distance along the second edge 125 from the bottom edge 126 of less than 50% of a total distance of the second edge 125.

In some typical preferred and non-limiting examples, the second flange arrangement 152 is angled inwardly between 5-20° from the second edge 125 to the bottom edge 126.

Many embodiments of the second flange arrangement 152 are possible. In one non-limiting example, the second flange arrangement 152 includes a ramp 154. The ramp 154 can be angled inwardly between 5-20° from the second edge 125 in a direction toward the bottom edge 126.

The second flange arrangement 152 can include a lip 156. The lip 156 can be helpful to hold the filter cartridge 60 in place in the filter cartridge side 138. In the example shown, the lip 156 is spaced from and is facing the grid 134. In many typical arrangements, the lip 156 will be extending from and angled relative to the ramp 154, such that it is angled between about 90-130°.

Figure 13:
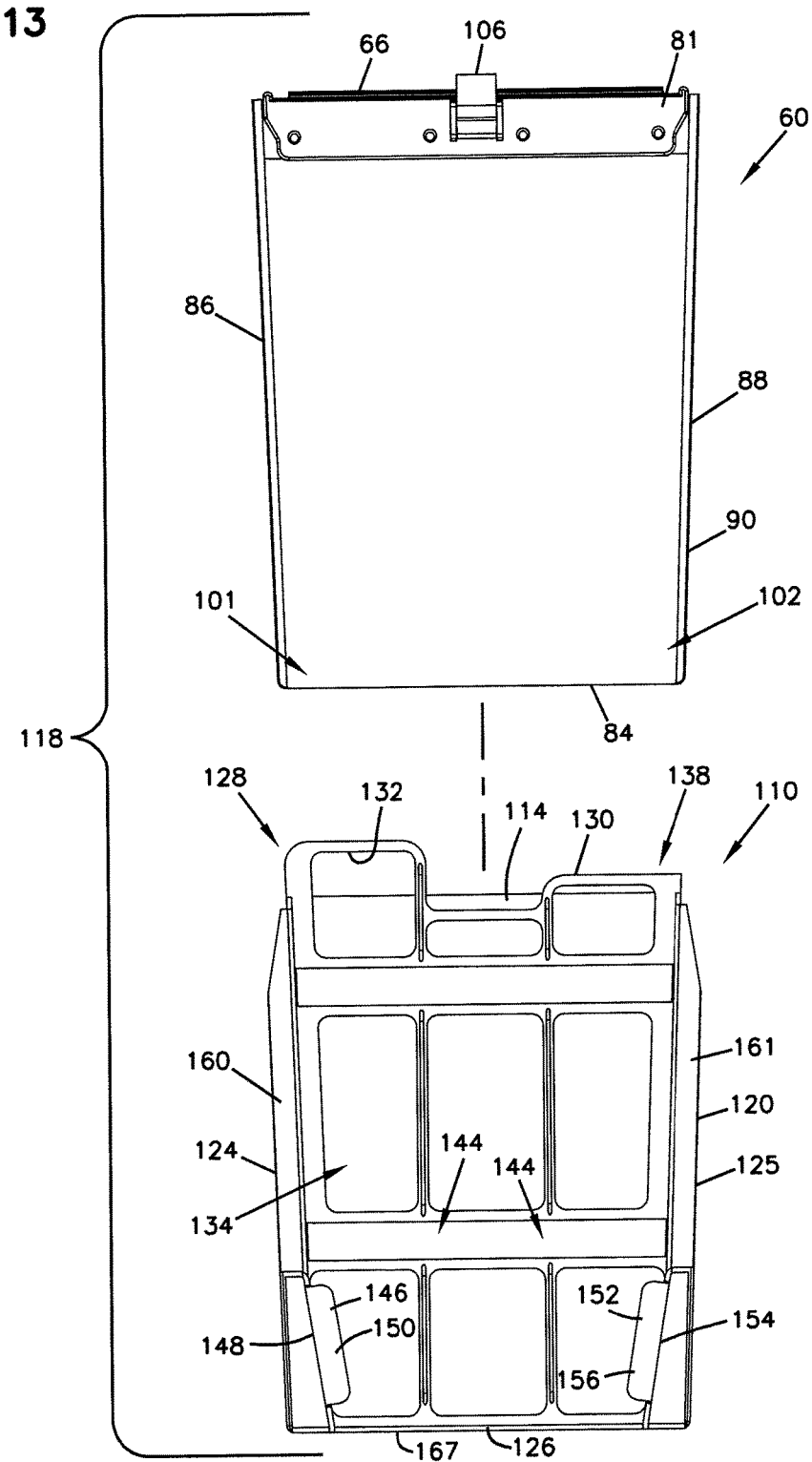
FIG. 13 is a partially exploded front view of a dual filter assembly including the bio-cartridge of FIG. 11 and the filter cartridge of FIGS. 5-8 being shown for assembly in the cassette.

FIG. 13 shows the filter cartridge 160 as it is being inserted or removed from the filter cartridge side 138 of the grid 134. FIG. 15 shows the filter cartridge 60 operably and removably held in the filter cartridge holder arrangement 144 by the first flange arrangement 146 and the second flange arrangement 152. The filter cartridge 60, including the frame 62 and media pack 64 is held between and against the first flange arrangement 146 and the second flange arrangement 152. In preferred embodiments, the first and second flange arrangements 146, 152 hold the filter cartridge 60 against the grid 134.

By review of FIGS. 13 and 15, it will be apparent that the first section 101 and second section 102 (FIG. 20) of the filter cartridge 60 becomes pressed against the respective ramp 148, 154 and will help form a seal between and against the material of the sock 90 and the filter cartridge holder arrangement 144, which includes in this embodiment, the first and second flange arrangement 146, 152.

C. Example Aquarium Filter Assemblies, FIGS. 1-4, 16 and 17

The dual filter assembly 118 can be used as part of the aquarium filter assembly 20 of FIG. 1.

In FIG. 1, the filter components 34 include the dual filter assembly 118. The filter cartridge 60 is shown removed from the dual filter assembly 118. The bio-cartridge 110 is shown, including the cassette 120 holding the biological host filter media element 112.

The dual filter assembly 118 is removably oriented in the interior volume 30 of the housing 22. The water inlet 42 is upstream of the dual filter assembly 118, and the water outlet 44 is downstream of the dual filter assembly.

In preferred arrangements, the dual filter assembly 118 is slidable in and out of the housing 22. In the example shown, the dual filter assembly 118 is slidably received within the housing 22 through engagement between the first and second side edges 124, 125 of the cassette 120 and the receiving grooves 48, 49 in the housing 22.

In a non-limiting example, when the dual filter assembly 118 is oriented in the housing 22, the first and second slide rails 160, 161 engage against and slide within the receiving grooves 48, 49. In this particular embodiment, the first and second side pieces 164, 165 are located outside of the receiving grooves 48, 49, and the dual filter assembly 118 is held laterally in place in the housing 22 because of the slide rails 160, 161 being contained within the receiving grooves 48, 49.

Figure 16:
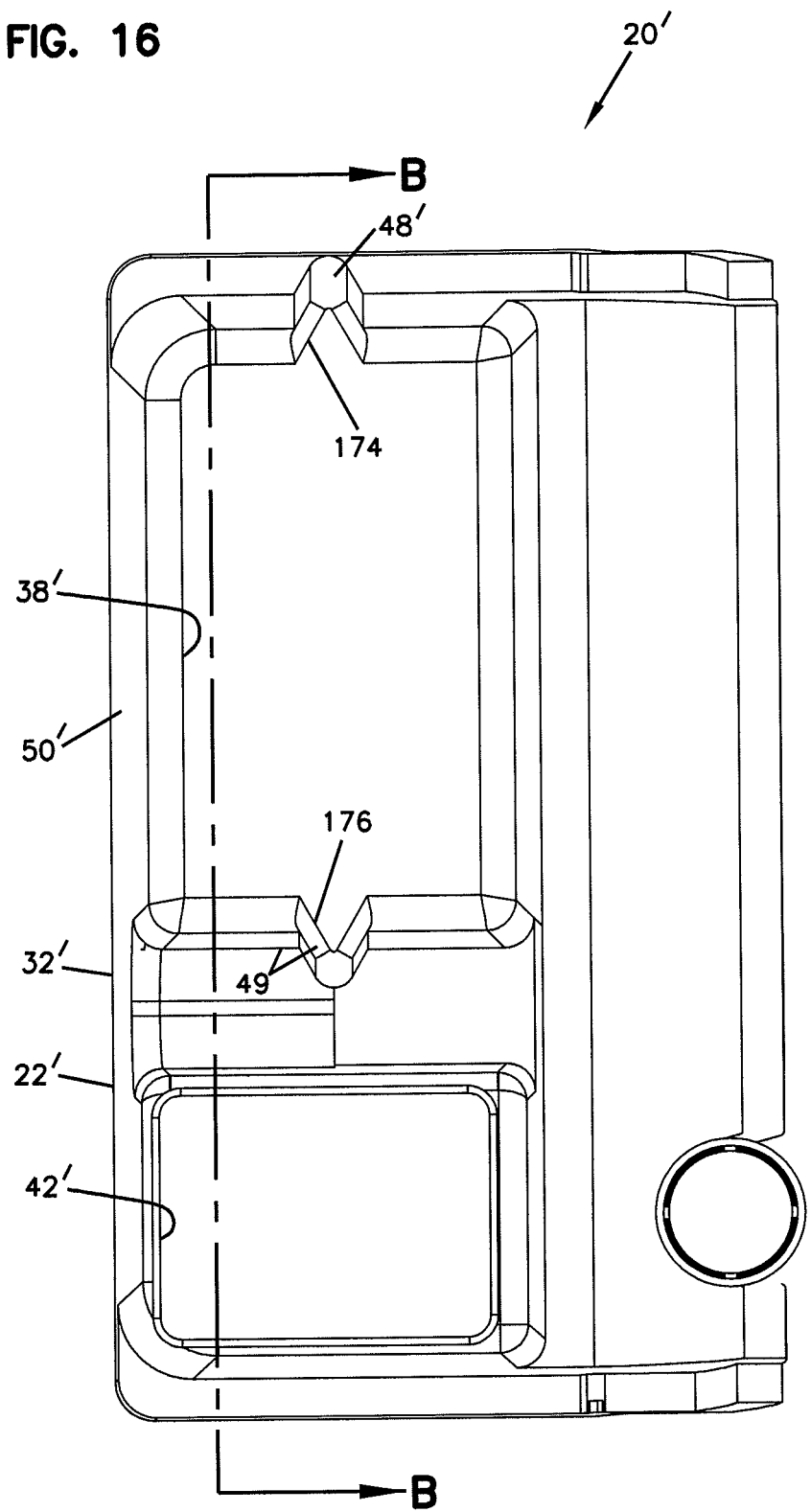
FIG. 16 is a bottom view of a housing for an alternate embodiment of a filter assembly.
Figure 17:
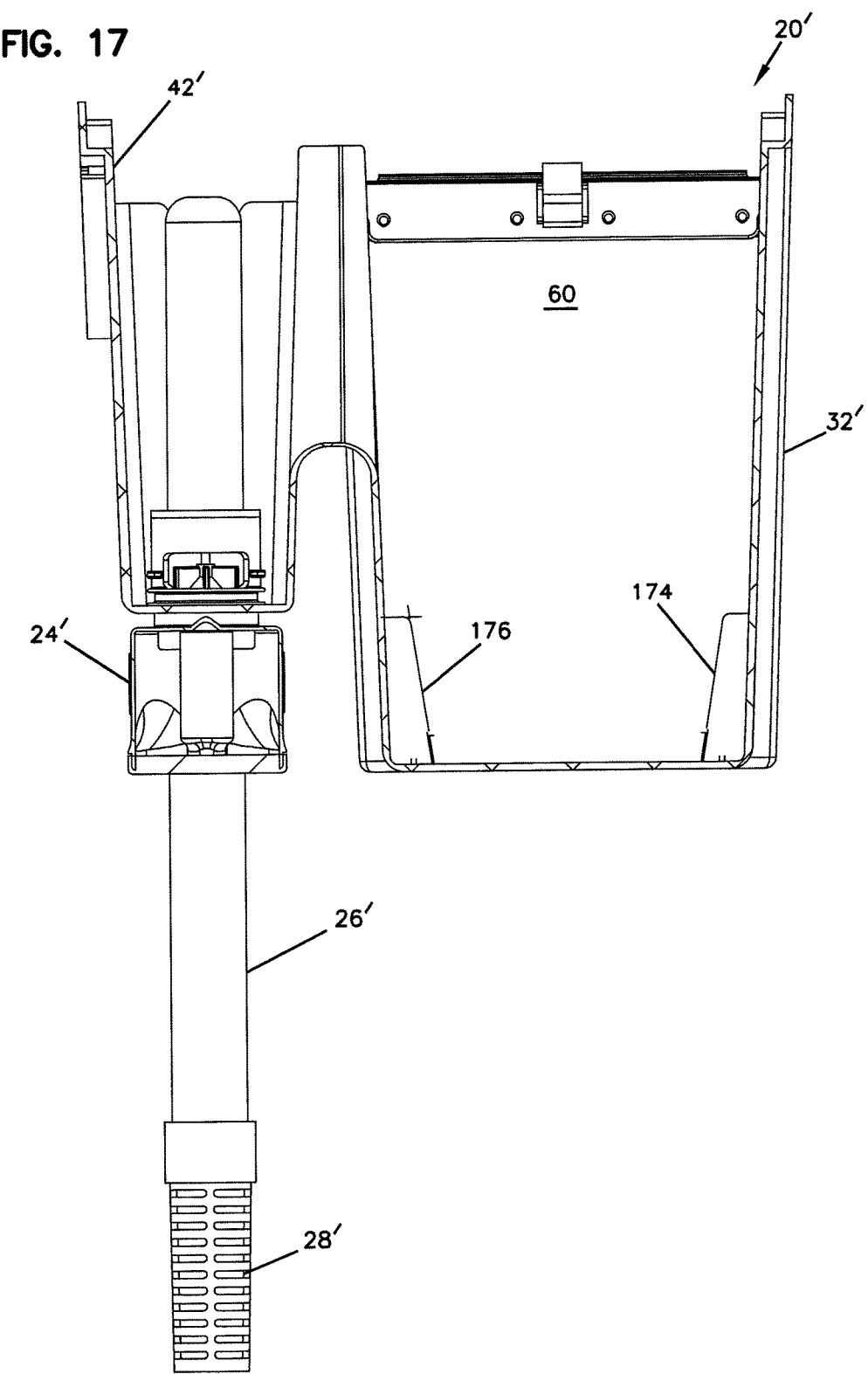
FIG. 17 is the cross-sectional view of the alternate housing of FIG. 16 and including the filter cartridge of FIGS. 5-8 installed there within, the cross-section being taken along the line B-B of FIG. 16.

An alternate embodiment of an aquarium filter assembly is shown in FIGS. 16 and 17 at 20'. In this embodiment, the housing 22' also includes first and second receiving grooves 48' 49', but in this embodiment, the first receiving groove 48' has a sloped section 174 that is angled inwardly toward the second groove 49' as the groove 48' extends downwardly along the sidewall 32' and toward the closed bottom 54'. Similarly, the second receiving groove 49' has a sloped section 176 that is angled inwardly toward the first groove 48', as the sloped section 176 extends downwardly along the sidewall 32' and toward the closed bottom 54'. This is in contrast to the first and second grooves 48, 49 of FIGS. 1-4, in that those receiving grooves 48, 49 are not sloped and extend straight up and down, vertically, along the inside surface 52 of the sidewall 32 between the top 50 and the closed bottom 54.

The filter cartridge 60 of FIGS. 5-8 can be removably oriented in the first and second receiving grooves 48', 49'. When the filter cartridge 60 is oriented in the housing 22, side edges 86, 88 of the media pack 64 are oriented within the first and second receiving grooves 48', 49', and the cartridge 60 is slid vertically downwardly into the interior volume 30' of the housing 22'. The first and second sections 101, 102 of the sock 90 are then compressed between and against the sloped sections 174, 176 of the grooves 48', 49' and the recessed sections 74, 76 of the frame 62. That is, the recessed section 74 of the first side member 70 is adjacent to the first receiving groove sloped section 174, while the recessed section 77 of the second side member 71 is adjacent to the second receiving groove sloped section 176. The first and second sections 101, 102 are compressed in between the respective sloped sections 174, 176 and the respective recessed sections 74, 77 of the frame 62. The compression of these sections 101, 102 of the sock 90 help to form a seal between the filter cartridge 60 and the receiving grooves 48', 49'.

In the system of FIGS. 16 and 17, a separate biological host filter element, such as element 112, may also be mounted within the filter chamber 36'.

C. Example Methods

A method of servicing an aquarium filter assembly can be carried out based on the foregoing description and principles.

For example, in one method, there is a step of removing filter cartridge 60 from interior volume 30, 30' of a filter housing 22, 22'. Next, the media pack 64 is removed from the frame 62.

In one example, the step of removing the media pack 64 from the frame 62 includes removing the sock 90 from over the frame 62. In one non-limiting example, this can be carried out by removing clip 106, which releases the compression of first and second flanges 81, 82, allowing the removal of the sock 90 from the frame 62.

A new media pack 64 is provided and secured to the frame 62. In one example, the new media pack is secured to the frame 62 so that a bottom of the new media pack 64 is adjacent to the bottom member 68 of the frame 62; a first side edge 86 of the new media pack 64 is adjacent to the first section 73 of the first side member 70 and is spaced from the recessed section 74 of the first side member 70; and a second side edge 88 of the new media pack 64 is adjacent to the first section 76 of the second side member 71 and is spaced from the recessed section 77 of the second side member 71.

In one non-limiting example, the step of securing the new media pack 64 to the frame includes inserting the frame 62 through mouth 98 of sock 90 so that the first side edge 86 is adjacent to the first section 73 and is spaced from the first recessed section 74, and so that the second side edge 88 is adjacent to the first section 76 and is spaced from recessed section 77. The sock 90 can then be secured to the frame 62 by pressing the first and second flanges 81, 82 against the rim 104 of the panel sections 92, 93 to trap the top of the panel sections 92, 93 between a respective flange 81, 82 and the top member 66. Pressure clip 106 can then be mounted over the flanges 81, 82 to hold them in place.

The new filter cartridge 60 may then be again oriented into the housing 22, 22'. In one example, the filter cartridge 60 will be mounted into the filter cartridge side 138 of the dual filter assembly 118. This will be done by sliding the filter cartridge 60 into the filter cartridge holder arrangement 144 so that the filter cartridge 60 is held between the first and second flange arrangements 146, 152. The dual filter assembly 118 may then be mounted into housing 22.

In another example, the new filter cartridge 60 is mounted into the housing 22' by directly sliding the new filter cartridge 60 into receiving grooves 48', 49' until the media pack 64 engages against the closed bottom 54' and the recessed sections 74, 77 are adjacent to the sloped sections 174, 176.

The above specification, examples and data provide example principles. Many embodiments can be made applying these principles.

What is claimed is:

1. An aquarium filter cartridge comprising:
   (a) a frame having a top member, a bottom member, a first side member between the top member and bottom member, and a second side member between the top member and the bottom member;
      (i) the first side member having a first section in extension from the top member, and a recessed section between the first section and the bottom member;
         (A) the recessed section being laterally spaced relative to the first section toward the second side member;
         (B) the recessed section of the first side member extending a distance of 20% or greater than a total distance between the top member and the bottom member;
      (ii) the second side member having a first section in extension from the top member, and a recessed section between the first section of the second side member and the bottom member;
         (A) the recessed section of the second side member being laterally spaced relative to the first section of the second side member toward the first side member;
         (B) the recessed section of the second side member extending a distance of 20% or greater than a total distance between the top member and the bottom member;
   (b) a media pack attached to the frame; the media pack having opposing panel sections and including a bottom, a first side edge extending from the bottom, and a second side edge extending from the bottom;
      (i) the bottom of the media pack being adjacent to the bottom member of the frame; the first side edge being adjacent to the first section of the first side member and being spaced from the recessed section of the first side member, and the second side edge being adjacent to the first section of the second side member and being spaced from the recessed section of the second side member;
      (ii) the media pack having first and second wedge-shaped sections adjacent to the recessed sections of the first side member and second side member that are frame-free between the opposing panel sections;
   (c) the first section of the first side member is parallel to the first section of the second side member;
   (d) (i) the recessed section of the first side member is angled inwardly between 5-20° from the first section of the first side member to the bottom member; and (ii) the recessed section of the second side member is angled inwardly between 5-20° from the first section of the second side member to the bottom member;
   (e) (i) the recessed section of the first side member extends a distance 20-50% of a total distance between the top member and the bottom member; and (ii) the recessed section of the second side member extends a distance of 20-50% of a total distance between the top member and the bottom member.

2. The filter cartridge of claim 1 wherein:
   (a) the media pack comprises a sock forming a surrounding wall with the first and second side edges and the bottom being a closed bottom; the surrounding wall and the bottom defining an interior volume; the sock including an open mouth opposite of the closed bottom;
      (i) the frame being removably oriented in the interior volume of the sock to provide the open mouth being adjacent to the top member of the frame.

3. The filter cartridge of claim 2 further comprising:
   (a) activated carbon within the interior volume of the sock.

4. The filter cartridge of claim 2 wherein:
   (a) the frame includes first and second flanges flexibly extending from opposite sides of the top member; a rim of the mouth of the sock being received between the first and second flanges and the top member; and
   (b) a removable pressure clip holding the first and second flanges against the rim of the sock.

5. The filter cartridge of claim 1 wherein:
   (a) the recessed section of the first side member extends a distance of less than 50% of a total distance between the top member and the bottom member; and
   (b) the recessed section of the second side member extends a distance of less than 50% of a total distance between the top member and the bottom member.

6. The filter cartridge of claim 1 wherein:
   (a) the frame further includes at least a pair of supporting bars between the first side member and second side member and in extension between the top member and the bottom member.

7. An aquarium filter assembly comprising:
   (a) a housing having a sidewall, an interior volume, a water inlet, and a water outlet; the sidewall having first and second opposing receiving grooves in the interior volume;
      (i) the first receiving groove having a sloped section being angled inwardly toward the second groove; and
      (ii) the second receiving groove having a sloped section being angled inwardly toward the first groove; and
   (b) the filter cartridge of claim 1 removably oriented in the first and second receiving grooves; the water inlet being upstream of the filter cartridge, and the water outlet being downstream of the filter cartridge;
      (i) the recessed section of the first side member being adjacent to the first receiving groove sloped section;
      (ii) the recessed section of the second side member being adjacent to the second receiving groove sloped section; and (iii) the first wedge-shaped section of the media pack being compressed between and against the first receiving groove sloped sections and the recessed section of the first side member; and (iv) the second wedge-shaped section of the media pack being compressed between and against the second receiving groove sloped sections and the recessed section of the second side member.

8. The aquarium filter assembly of claim 7 further comprising:

(a) a biological host media filter element removably oriented in the interior volume of the housing downstream of and adjacent to the filter cartridge.

9. A method of servicing an aquarium filter assembly; the method comprising:

(a) removing a filter cartridge according to claim 1 from an interior volume of a filter housing;

(b) removing the media pack from the frame;

(c) providing a new media pack and securing the new media pack to the frame so that a bottom of the new media pack is adjacent to the bottom member of the frame, a first side edge of the new media pack is adjacent to the first section of the first side member and is spaced from the recessed section of the first side member, and a second side edge of the new media pack is adjacent to the first section of the second side member and is spaced from the recessed section of the second side member; the new media pack having first and second wedge-shaped sections that are frame-free between opposing panel sections of the new media pack.

* * * * *